Patented Jan. 23, 1951

2,538,764

UNITED STATES PATENT OFFICE 2,538,764

ACYLAMIDO-PHENYLPROPANEDIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,174

11 Claims. (Cl. 260—558)

This application is a continuation-in-part of our copending application Serial No. 15,264, filed March 16, 1948, now U. S. Patent 2,483,884, and the invention relates to new chemical compounds and to chemical methods useful for their synthesis. More particularly, the invention relates to a new class of N-acylated amino diols and to methods for obtaining these products. The N-acylated amino diols of the invention can be represented by the formula,

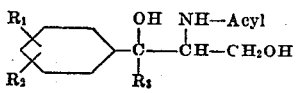

where $R_1$ and $R_2$ are the same or different and represent hydrogen, halogen, lower alkyl or lower alkoxy radicals and $R_3$ is hydrogen or a lower alkyl radical. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" (reg.) series or form and to the trans diastereoisomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula that the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

In accordance with the invention N-acylated amino diols of the above general formula are produced by mono-acylating an amino diol of the formula,

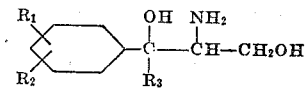

where $R_1$, $R_2$ and $R_3$ have the same significance as given above. These products may also be obtained by selectively hydrolyzing a polyacylated amino diol of the formula,

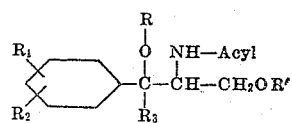

where R and R' are the same or different and represent hydrogen or acyl radicals at least one of said R and R' being an acyl radical and $R_1$, $R_2$ and $R_3$ have the same significance as given above.

In carrying out the mono-acylation an acyl halide, anhydride or ester may be used as the acylating agent. When acyl esters are employed as the acylating agent the reaction is carried out under substantially anhydrous conditions at a temperature below about 150° C. In some instances where the acylating ester is relatively inactive it is preferable to add a small amount of an alkali metal alkoxide to the reaction mixture to catalyze the reaction. When such catalysts are employed even such unreactive esters as benzoyl esters react within an hour at temperatures in the neighborhood of 60 to 80° C. Where an active acyl ester such as a dihaloacetyl ester is used, catalysts are unnecessary and the reaction is preferably carried out by heating the mixture between 30 and 100° C. for from twenty-four to one-half hours respectively.

In carrying out the acylation with an acyl halide either anhydrous or aqueous conditions can be used. When operating under substantially anhydrous conditions the temperature is maintained at about 0 to 15° C. and the reaction allowed to proceed, preferably in an inert organic solvent such as ethyl acetate, ether, dioxane, benzene and the like, for about one hour. The aqueous modification is, of course, subject to the limitation that the acyl halide must not be too reactive for, in such a case, hydrolysis rather than acylation is the predominating reaction. The preferred method of carrying out the reaction under aqueous conditions is to employ about one equivalent of the acyl halide and a two-phase system consisting of water and a water-immiscible organic solvent having at least about one equivalent of an alkaline substance present in the aqueous phase.

When an acyl anhyride is used alone as the acylating agent the reaction is carried out with excess reagent under anhydrous conditions at a temperature between about 50 and 100° C. and preferably in the neighborhood of about 70° C. The heating time, of course, depends to a large extent upon the nature of the acyl anhydride and the temperature used but in general should not exceed about one-half hour. In most instances about ten minutes at a temperature of about 70° C. is sufficient to bring about the desired reaction. Where an acid anhydride is used in conjunction with a tertiary organic base the amount of anhydride employed is substantially one equivalent and the temperature employed may lie, roughly, between the limits of 0° and 100° C.

As stated above, the products of the invention may also be prepared by selective hydrolysis of a polyacylated amino diol. This hydrolysis is carried out in a reaction mixture consisting of an aqueous solution of a water-miscible organic solvent containing about the equivalent amount of alkali necessary to theoretically hydrolze the O-acyl groups present in the starting material. The reaction may be carried out at a temperature ranging from about −10° C. to the boiling point of the mixture, that is, about 80 to 90° C. When easily hydrolyzable O-acyl groups such as aliphatic acyl groups are present in the starting material the reaction can be carried out at about 10 to 30° C. within about one hour. However, where the O-acyl groups are of a type more resistant to hydrolysis such as benzoyl groups or the starting material is quite insoluble in the reaction mixture, the reaction is preferably carried out at higher temperatures. In the latter instance it is also advisable to employ a reaction mixture consisting of 10 to 20% water and 90 to 80% organic solvent. Some examples of the water miscible organic solvents which may be employed in this hydrolytic process are acetone, methanol, ethanol, n-propanol, isopropanol, methyl ethyl ketone and the like. As alkaline hydrolytic catalysts alkali metal hydroxides, alkali metal carbonate, barium hydroxide, calcium hydroxide and the like may be used.

The products of the invention are valuable as intermediates for the preparation of other organic compounds. They are of particular value as intermediates in the preparation of other organic compounds possessing antibiotic activity. The products having the pseudo structural form and having no substituents in the phenyl ring are of particular value in the preparation of (l)-ψ-1-p-nitrophenyl-2-dichloroacetamidopropane-1,3-diol, a compound possessing outstanding and unique antibiotic properties. One of the methods for effecting this transformation consists in completely acylating any of the products of the invention having the aforementioned structural characteristics, nitrating the reaction product, hydrolyzing the completely acylated nitro substituted amino diol to the corresponding free amino diol, resolving the optical isomers (if necessary) and dichloroacetylating the (l) optical isomer of the amino diol.

In addition to the uses mentioned above, some of the products of the invention are themselves valuable antibiotics.

The invention is illustrated by the following examples.

*Example 1*

(a) 1.7 g. of (dl)-reg.-1-phenyl-2-aminopropane-1,3-diol is treated with 1.6 g. of methyl dichloroacetate and the mixture heated at 100° C. for one-and-a-quarter hours. The reaction mixture is evaporated to dryness in vacuo and the residue washed with 20 cc. portions of petroleum ether. Recrystallization of the insoluble material yields the desired (dl)-reg.-1-phenyl-2-dichloroacetamidopropane-1,3-diol in pure form, M. P. 154–6° C. The formula of this product is,

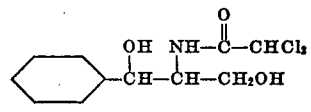

(dl)-Reg. form (b) A mixture consisting of 4 g. of (dl)-ψ-1-phenyl-2-aminopropane-1,3-diol and 12 cc. of methyl dichloroacetate is heated at 85° C. for forty-four minutes. The reaction mixture is cooled, diluted with petroleum ether and the gummy crystals which separate crystallized from water. The product thus obtained is (dl)-ψ-1-phenyl-2-dichloroacetamidopropane-1,3-diol of formula,

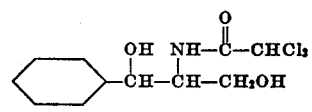

(dl)-ψ Form

If desired the above reaction can also be carried at 45–50° C. by stirring the reaction mixture for about 16 hours.

(c) A solution consisting of 2.4 g. of (l)-ψ-1-phenyl-2-aminopropane-1-3-diol in 8 cc. of methyl dichloroacetate is heated at 65° C. for four hours. The reaction mixture is cooled, diluted with petroleum ether and the crystals which precipitate collected. Recrystallization of these from water yields the desired (l)-ψ-1-phenyl-2-dichloroacetamidopropane-1,3-diol of formula,

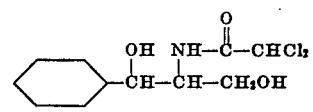

(l)-ψ Form

*Example 2*

(a) 500 mg. of (dl)-ψ-1-phenyl-2-acetamido-3-acetoxypropane-1,1-diol is added to a solution consisting of 25 cc. of 0.1 N sodium hydroxide solution and an equal volume of acetone at 0° C. and the resulting mixture stirred for one hour. The solution is neutralized with hydrochloric acid and the acetone evaporated under reduced pressure. The residual aqueous solution is extracted with ethyl acetate, the extracts dried and the ethyl acetate dissolved in vacuo. The residue which consists of (dl)-ψ-1-phenyl-2-acetamidopropane-1,3-diol is purified by recrystallization from ethylacetate or alcohol; M. P. 136–7° C. The formula of this compound is,

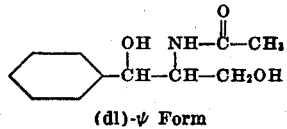

(dl)-ψ Form (b) A mixture consisting of 3 g. of (dl)-ψ-1-phenyl-2-aminopropane-1,3-diol and 10 cc. of acetic anhydride is heated at 70° C. for ten minutes, cooled, and the reaction mixture evaporated to dryness in vacuo below 40° C. Crystallization of the residue from ethyl acetate yields one of the two crystal forms of (dl)-ψ-1-phenyl-2-acetamidopropane-1,3-diol. One of these crystalline forms melts at 136–7° C. while the other melts at 144–5° C.

*Example 3*

1 g. of the tribenzoate of (dl)-ψ-1-phenyl-2-aminopropane-1,3-diol in 50 cc. of acetone is added to 50 cc. of 0.1 N sodium hydroxide solution at room temperature and the mixture allowed to stand for one hour. The excess alkali is exactly neutralized and the solution evaporated to dryness in vacuo. The residue is washed with water to remove the salt and recrystallized from ethanol. The product thus obtained is (dl)-ψ-1-phenyl-2-benzamidopropane-1,3-diol [M. P. 165–6° C.] which has the formula,

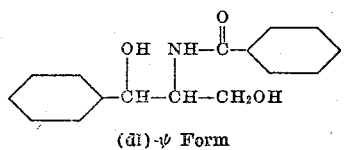

(dl)-ψ Form

*Example 4*

4 g. of p-nitrobenzoyl chloride is added in small portions with shaking to a suspension of 3.3 grams of (dl)-ψ-1-phenyl-2-aminopropane-1,3-diol in 40 cc. of 1 N sodium hydroxide solution. After the addition has been completed the precipitate is collected and crystallized from ethyl acetate to obtain the desired (dl)-ψ-1-phenyl-2-p-nitrobenzamidopropane-1,3-diol of formula,

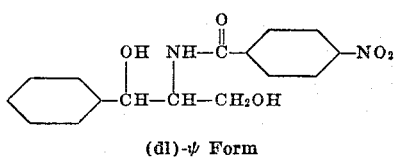

(dl)-ψ Form

*Example 5*

2.5 g. of 3,4-dichlorobenzoyl chloride is added to a solution of 1.7 g. of (dl)-ψ-1-phenyl-2-aminopropane-1,3-diol in 40 cc. of ethyl acetate at 0–10° C. and the resulting mixture allowed to stand for one hour. The solution is washed with dilute hydrochloric acid and then with saturated sodium bicarbonate solution and then finally with water. The ethyl acetate extract is dried and concentrated in vacuo until crystals begin to appear. The crystalline product which separates from the cooled solution on standing is the desired (dl)-ψ-1-phenyl-2-(3',4'-dichlorobenzamido)propane-1,3-diol. This product has the formula,

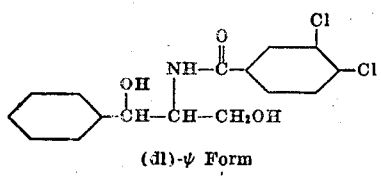

(dl)-ψ Form

*Example 6*

A mixture consisting of 2 g. of (l)-ψ-phenyl-2-aminopropane-1,3-diol, 1 cc. of a 1 N solution of sodium methylate in methanol, 3 g. of methyl-p-methylbenzoate and 40 cc. of methanol is heated for one hour on a steam bath. The alkali is exactly neutralized by the addition of 1 cc. of 1 N hydrochloric acid. The methanol is removed by distillation and the residue crystallized from hot water. The product thus obtained is (l)-ψ-1-phenyl-2-p-methylbenzamidopropane-1,3-diol which has the formula,

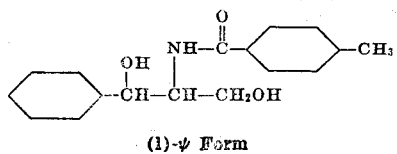

(l)-ψ Form

*Example 7*

A solution consisting of 1.8 g. of (dl)-ψ-1-p-methylphenyl-2-aminopropane-1,3-diol, 1.5 g. of phthalic anhydride and 10 cc. of dry pyridine is heated at 100° C. for one hour. The reaction mixture is cooled, diluted with 50 cc. of 2 N hydrochloric acid and the precipitate collected. Recrystallization from hot water yields the desired (dl)-ψ-1-p-methylphenyl-2-orthocarboxybenzamidopropane-1,3-diol of formula,

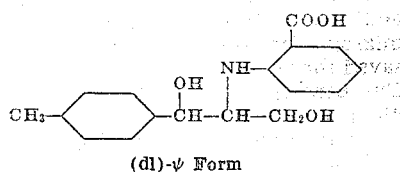

(dl)-ψ Form

*Example 8*

(a) A mixture consisting of 3 g. of (dl)-ψ-1-p-iodophenyl-2-aminopropane-1,3-diol and 7 cc. of methyl dichloroacetate is heated at 75–85° C. for one hour. The reaction mixture is cooled, diluted with 5 volumes of petroleum ether and the precipitated (dl)-ψ-1-p-iodophenyl-2-dichloroacetamidopropane-1,3-diol purified and recrystallized from water; M. P. 125–6° C. The formula of this product is,

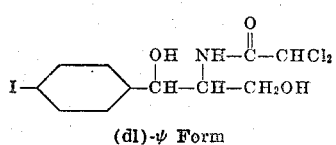

(dl)-ψ Form (b) 2 g. of (l)-ψ-1-p-iodophenyl-2-aminopropane-1,3-diol is heated for twenty hours at 45° C. with 4 cc. of methyl dichloroacetate. The reaction mixture is diluted with five volumes of petroleum ether and the precipitated (l)-ψ-1-p-iodophenyl-2-dichloroacetamidopropane-1,3-diol collected and purified by recrystallization from water. The formula of this product is,

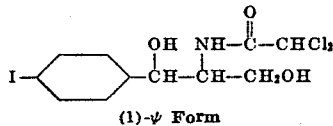

(l)-ψ Form

*Example 9*

A solution of 5.5 g. of the tris-phenylacetyl derivative of (dl) - reg. - 1 - o - chlorophenyl-2-aminopropane-1,3-diol in 100 cc. of acetone is diluted with 100 cc. of 0.25 N sodium hydroxide solution at 0° C. and the resulting mixture allowed to stand for one-and-a-half hours. The excess alkali is neutralized with dilute hydrochloric acid and the reaction mixture concentrated in vacuo to a volume of approximately 25 cc. The desired (dl)-reg.-1-o-chlorophenyl-2-phenylacetamidopropane-1,3-diol which crystallizes from the solution on cooling is collected and purified by recrystallization from hot water. The formula of this product is,

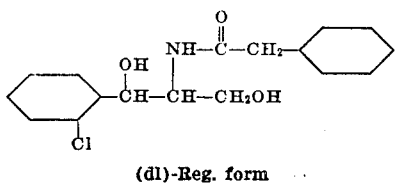

(dl)-Reg. form

*Example 10*

8 g. of (dl)-ψ-1-o-methylphenyl-2-aminopropane-1,3-diol is treated with an excess of acetyl chloride at room temperature in a solvent of dry benzene. When a considerable amount of the hydrochloride salt of (dl)-ψ-1-o-methylphenyl-2-aminopropane-1,3-diol has separated from the solution, the reaction is stopped by the addition of 300 cc. of water. After thorough mixing, the aqueous solution is removed and saved for recovery of the unacylated amino diol. The benzene solution is washed with dilute sodium bicarbonate solution and then dried. The benzene is removed by distillation in vacuo and the crude (dl)-ψ-1-o-methylphenyl-2-acetamidopropane-1,3-diol taken up in alcohol and purified by recrystallization from alcohol. The formula of this product is,

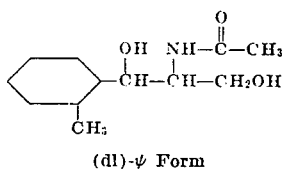

(dl)-ψ Form

*Example 11*

1.5 g. of furoyl chloride is added to a solution of 1.7 g. of (dl)-ψ-1-phenyl-2-aminopropane-1,3-diol in 30 cc. of ethyl acetate at 0-10° C. and the reaction mixture allowed to stand for one hour. 30 cc. of water is added, the ester layer removed and washed successively with dilute hydrochloric acid, saturated sodium bicarbonate solution and water. The ethyl acetate layer is dried and concentrated to a volume of about 6 cc. The desired (dl)-ψ-1-phenyl-2-furoylpropane-1,3-diol which separates is collected and purified by recrystallization from ethyl acetate. This product has the formula,

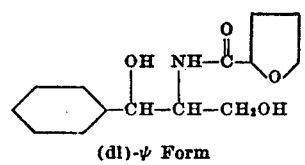

(dl)-ψ Form

*Example 12*

1.5 g. of nicotinoyl chloride is added to a solution of 2 g. of (dl)-reg.-1-o-ethylphenyl-2-aminopropane-1,3-diol in 30 cc. of ethyl acetate at 0° C. and the mixture allowed to stand for one hour. The ethyl acetate solution is washed with water, sodium bicarbonate solution and again with water. The ethyl acetate layer is dried, concentrated to a small volume in vacuo and cooled. The (dl)-reg.-1-o-ethylphenyl-2-nicotinamido-1,3-diol which separates from the solution is collected. The formula of this product is,

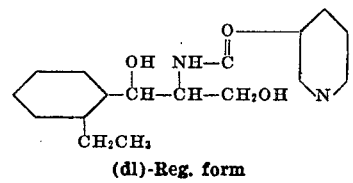

(dl)-Reg. form

*Example 13*

A mixture consisting of 1.8 g. of (dl)-reg.-3-phenyl-2-aminobutane-1,3-diol, 1 cc. of 1 N sodium methylate in methanol, 2.5 g. of ethyl-β,β-dimethylacrylate and 35 cc. of dry methanol is heated under reflux for one hour. The alkali is neutralized with 1 cc. of 1 N hydrochloric acid and the reaction mixture evaporated to dryness in vacuo. The residue is stirred with ligroin to remove the excess ester and the insoluble (dl)-reg. - 3 - phenyl - 2 - β,β - dimethylacrylamido-butane-1,3-diol collected and purified by recrystallization from ethyl acetate-petroleum ether mixture. The formula of this compound is

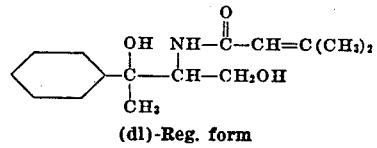

(dl)-Reg. form

*Example 14*

A mixture consisting of 1.7 g. of (dl)-ψ-1-phenyl-2-aminopropane-1,3-diol, 1 cc. of 1 N sodium methylate in methanol, 2 grams of ethyl lactate and 25 cc. of dry methanol is heated under reflux for one hour. 1 cc. of 1 N hydrochloric acid is added, the reaction mixture evaporated to dryness in vacuo and the residue crystallized from a small amount of warm water. The product thus obtained is (dl)-ψ-1-phenyl-2-lactamidopropane-1,3-diol of formula,

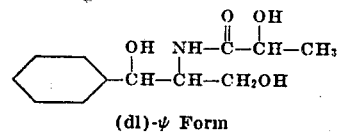

(dl)-ψ Form

*Example 15*

A solution of 0.05 g. of sodium methylate in 10 cc. of dry methanol is added to a solution consisting of 1.9 g. of (dl)-reg.-1-(3',4'-dimethylphenyl)-2-aminopropane-1,3-diol, 2.2 g. of ethyl cyanoacetate and 30 cc. of dry methanol and the mixture heated under reflux for one hour. 1 cc. of 1 N hydrochloric acid is added, the solvent removed by distillation in vacuo and the residue crystallized from ethylene dichloride (after removal of the salt by filtration of the hot solution). The product thus obtained is (dl)-reg.-1-(3',4' - dimethylphenyl) - 2 - cyanacetamidopropane-1,3-diol of formula,

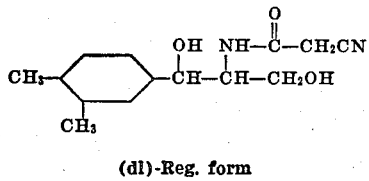

(dl)-Reg. form

Example 16

2 g. of methoxyacetyl chloride is added slowly with stirring to a two-phase mixture consisting of 2 g. of (dl)-ψ-1-m-methoxyphenyl-2-aminopropane-1,3-diol, 40 cc. of ethyl acetate and 30 cc. of 1 N potassium hydroxide solution. During the addition the temperature is maintained in the neighborhood of 0° C. The reaction mixture is stirred at 0° C. for one hour, the ester layer separated, washed with water and dried. The solvent is removed by distillation in vacuo and the residue recrystallized from water to obtain the pure (dl)-ψ-1-m-methoxyphenyl-2-methoxyacetamidopropane-1,3-diol of formula,

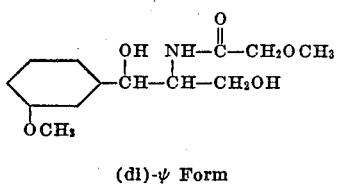

(dl)-ψ Form

Example 17

1.25 g. of succinic anhydride is added to a solution of 1.7 g. of (dl)-ψ-1-phenyl-2-aminopropane-1,3-diol in 20 cc. of hot water and the resulting mixture stirred for one hour. The solution is concentrated by heating under a stream of air to a volume of about 5 cc. and allowed to cool. The crystalline product which consists of (dl)-ψ - 1 - phenyl - 2 - β - carboxypropionamidopropane-1,3-diol of formula,

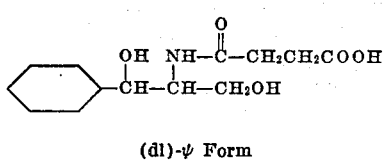

(dl)-ψ Form is collected, washed with a small amount of cold water and dried.

Example 18

A mixture consisting of 2.5 g. of (3-(3',4'-dichlorophenyl)-2-aminobutane-1,3-diol and 7 cc. of propionic anhydride is heated for ten minutes at 70° C., cooled and the mixture diluted with five volumes of petroleum ether. The precipitate is collected and recrystallized from hot water to obtain the pure (dl)-ψ-3-(3',4'-dichlorophenyl)-2-propionamidobutane-1,3-diol of formula,

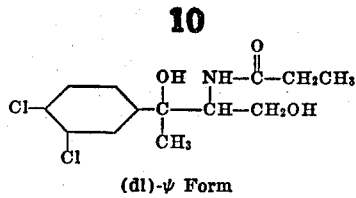

(dl)-ψ Form

Example 19

3 g. of dibromoacetyl bromide is added to a solution of 2.1 g. of (dl)-ψ-1-p-ethoxyphenyl-2-aminopropane-1,3-diol in 40 cc. of ethyl acetate at 0° C. The resulting mixture is stirred for one hour, 30 cc. of water added and the ester layer separated. The ethyl acetate layer is washed with water, saturated with sodium bicarbonate solution, again with water and then dried. The ethyl acetate is distilled in vacuo until the residue has a volume of about 8 cc. and then the residue is diluted with ligroin until the solution becomes cloudy. The mixture is cooled and the crystalline (dl) - ψ-1-p-ethoxyphenyl-2-dibromoacetamidopropane-1,3-diol of formula,

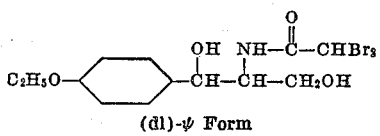

(dl)-ψ Form collected and dried.

Example 20

2 g. of α-chloropropionyl chloride is added to a solution of 1.7 g. of (dl)-ψ-1-phenyl-2-aminopropane-1,3-diol in 25 cc. of ethyl acetate at 0° C. and the resulting mixture stirred for one hour. The solution is washed with water, sodium bicarbonate solution, again with water and then dried. The solution is concentrated to a volume of 5 cc. in vacuo, diluted with ligroin until cloudy and then cooled. The crystalline product which separates from the solution is (dl)-ψ-1-phenyl -2-α-chloropropionamidopropane-1,3-diol of formula,

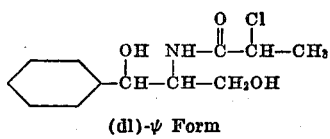

(dl)-ψ Form

Example 21

2.5 g. of α-acetoxypropionyl chloride is added to a solution of 1.7 g. of (dl)-ψ-1-phenyl-2-aminopropane-1,3-diol in 25 cc. of ethyl acetate at 0° C. and the resulting mixture stirred for one hour. The solution is washed with water, sodium bicarbonate solution and again with water. The ethyl acetate layer is dried, the ethyl acetate distilled in vacuo and the residue crystallized from ethylene dichloride to obtain the desired (dl)-ψ-1-phenyl-2-α-acetoxypropionamidopropane - 1, 3-diol of formula,

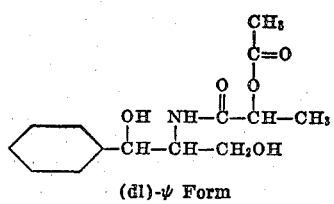

(dl)-ψ Form

In the foregoing examples we have employed a new class of amino diols and their polyacylated derivatives as starting materials. These starting materials can be prepared in a number of different ways. One of the general methods which can be used to prepare these products is that represented by the following diagram:

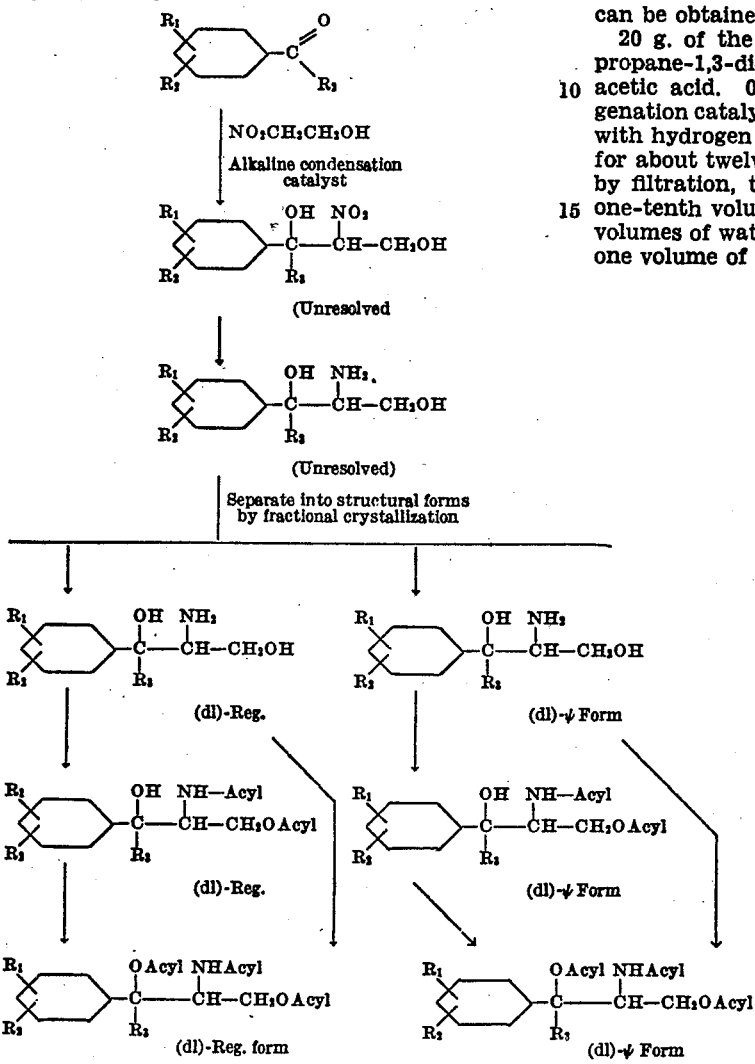

where $R_1$, $R_2$ and $R_3$ have the same significance as given above. Where optically active starting materials are desired the racemic structural forms of the free amino diol are resolved into their optical isomers via an optically active acid addition salt. The optically active amino diols so obtained can be used as starting materials per se or converted by acylation, as shown above, to the optically active O,N-diacyl or di-O,N-triacyl starting materials of the invention.

The following examples serve to illustrate the application of this general method to the preparation of some of the specific starting materials used in the foregoing examples.

*Example 22*

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

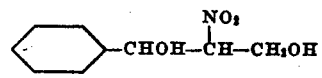

Unresolved can be obtained by acidification of the salt.

20 g. of the sodium salt of 1-phenyl-2-nitropropane-1,3-diol is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is (dl)-reg.-1-phenyl-2-aminopropane-1,3-diol (M. P. 103–4° C.) of formula,

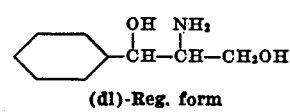

(dl)-Reg. form

The (dl)-ψ-1-phenyl-2-aminopropane-1,3-diol (M. P. 86–7° C.) can be separated from the chloroform filtrate remaining from the crystallization of the (dl)-reg. isomer by fractional crystallization.

A mixture consisting of 3 g. of (dl)-ψ-1-phenyl-2-acetamidopropane-1,3-diol and 10 cc. of acetic anhydride is heated for one-half hour on a steam bath. The reaction mixture is evaporated to dryness in vacuo and the residue crystallized from absolute ethanol to obtain the desired (dl)-ψ-1- phenyl-2-acetamido-3-acetoxypropane-1-ol (M. P. 168–9° C.) of formula,

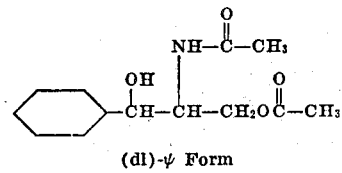

(dl)-ψ Form 2 g. of (dl)-ψ-1-phenyl-2-aminopropane-1,3-diol is added to a mixture composed of 4 cc. of acetic anhydride and 4 cc. of dry pyridine and the resulting mixture heated at 100° C. for about one-half hour. The reaction mixture is evaporated in vacuo and the residue recrystallized from methanol to obtain the triacetate of (dl)-ψ-1-phenyl-2-aminopropane-1,3-diol melting at 79° C. Its formula is

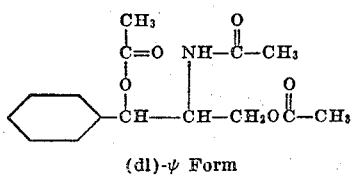

(dl)-ψ Form

This same product can also be prepared by substituting 2 g. of (dl)-ψ-1-phenyl-2-acetamido-3-acetoxypropane-1-ol for the (dl)-ψ-1-phenyl-2-aminopropane-1,3-diol employed in the above procedure.

4 g. of (dl)-ψ-1-phenyl-2-aminopropane-1,3-diol is dissolved in about 60 cc. of warm n-butanol containing an equivalent amount of (d)-camphor sulfonic acid and the (d)-camphor sulfonate salt of (l)-ψ-1-phenyl-2-aminopropane-1,3-diol which separates on standing is collected. The corresponding (d)-camphor sulfonate salt of the (d)-ψ isomer can be recovered, if desired, from the filtrate. The (d)-camphor sulfonate salt of (l)-ψ-1-phenyl-2-aminopropane-1,3-diol is dissolved in a small amount of water containing an excess of sodium hydroxide. The solution is extracted with ethyl acetate, the ethyl acetate extracts dried and the solvent distilled in vacuo. The residue consists of (l)-ψ-1-phenyl-2-aminopropane-1,3-diol which has the formula,

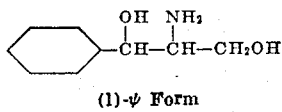

(l)-ψ Form

Addition of excess alkali to the (d)-camphor sulfonate salt of (d)-ψ-1-phenyl-2-aminopropane-1,3-diol yields the desired (d)-ψ isomer of the amino diol.

A solution consisting of 2 g. of (l)-ψ-1-phenyl-2-aminopropane-1,3-diol in 10 cc. of acetic anhydride is heated for thirty minutes at 90–100° C., cooled and the excess anhydride removed by distillation in vacuo below 50° C. Crystallization of the residue from absolute alcohol yields the desired (l)-ψ-1-phenyl-2-acetamido-3-acetoxypropane-1-ol of the formula,

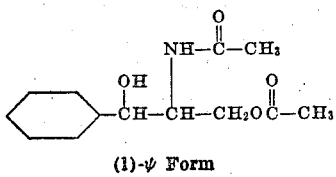

(l)-ψ Form

Example 23

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methyl-phenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

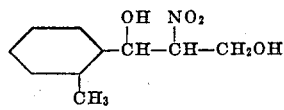

(Unresolved)

18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the (dl)-reg. and (dl)-ψ-1-o-methylphenyl-2-aminopropane-1,3-diol is taken up in and crystallized from chloroform to obtain the (dl)-reg.-1-o-methylphenyl-2-aminopropane-1,3-diol in crystalline form. Its formula is:

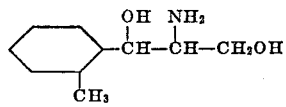

(dl)-Reg. form

The chloroform filtrate from which the (dl)-reg.-1-o-methylphenyl-2-aminopropane-1,3-diol has been removed is evaporated in vacuo to obtain the crude (dl)-ψ-1-o-methylphenyl-2-aminopropane 1,3-diol.

6 g. of (dl)-reg.-1-o-methylphenyl-2-aminopropane-1,3-diol is heated with 30 cc. of pyridine and 25 g. of benzoic anhydride for one hour at 100° C. The reaction mixture is evaporated to dryness in vacuo, taken up in a small amount of water and the mixture made alkaline to pH 10 with sodium hydroxide solution. The insoluble (dl)-reg.-1-o-methylphenyl-2-benzamido-1,3-dibenzoyloxypropane of formula,

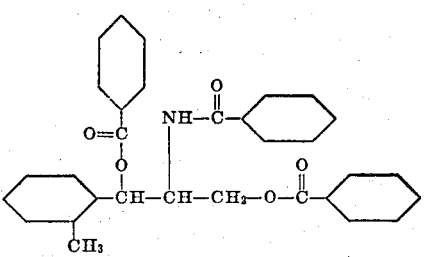

(dl)-Reg. form is collected, washed with water and dried.

Example 24

The starting materials having as the root of their formulae the structure,

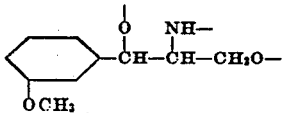

can be obtained by starting with m-methoxy-benzaldehyde and β-nitroethanol and applying the procedures described in Examples 22 and 23.

Example 25

The starting materials which have as the root of their formulae the structure,

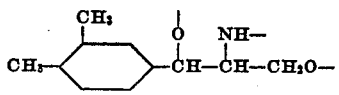

can be prepared by starting with 3,4-dimethyl-benzaldehyde and β-nitroethanol and following the procedures described in Examples 22 and 23.

Example 26

The compounds used as starting materials in the preparation of the products having the general formula,

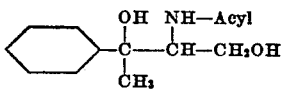

are prepared by starting with acetophenone and β-nitroethanol and following the procedures described in Examples 22 and 23.

Example 27

The products used as starting materials having as the root of their formulae the structure,

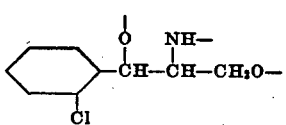

can be prepared from o-chlorobenzaldehyde and β-nitroethanol by using the procedures described in Examples 22 and 23. However, the preferred method of reducing the 1 - o - chlorophenyl-2-nitropropane-1,3-diol is by the use of stannous acetate or chloride in acetic acid rather than by the catalytic method disclosed in the aforementioned examples.

Some of the subject matter disclosed but not claimed herein, is disclosed and claimed in our copending applications filed on even date herewith, Serial Nos. 76,172, 76,173, 76,175, 76,176, 76,177 (now Patent No. 2,514,376), 76,178 (now Patent No. 2,514,377), 76,179 (now Patent No. 2,483,885) and 76,180.

What we claim is:

1. A compound of the formula,

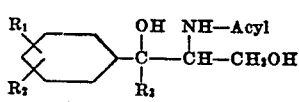

where $R_1$ and $R_2$ are members of the class consisting of hydrogen, halogen, lower alkyl and lower alkoxy radicals and $R_3$ is a member of the class consisting of hydrogen and lower alkyl radicals, said acyl being a carboxylic acid acyl radical.

2. A compound of the formula,

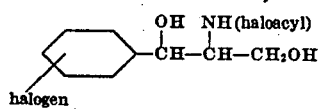

said haloacyl being a halogenated lower aliphatic carboxylic acid acyl radical.

3. A compound of the formula,

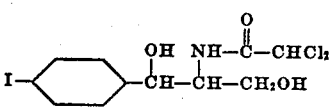

4. A compound of the formula,

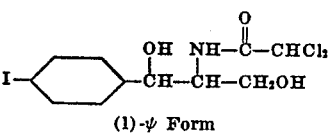

(1)-ψ Form

5. A compound of the formula,

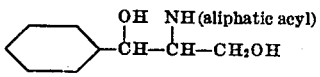

said aliphatic acyl being a lower aliphatic carboxylic acid acyl radical.

6. A compound of the formula,

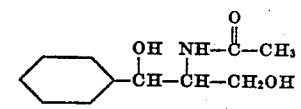

7. A compound of the formula,

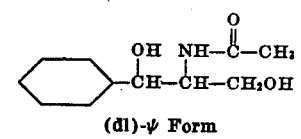

(dl)-ψ Form

8. A compound of the formula,

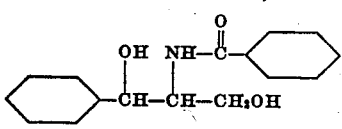

9. A compound of the formula,

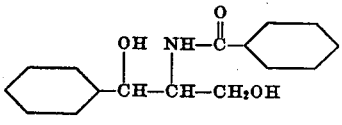

(dl)-ψ Form 10. 1-phenyl-2-(dichloroacetamido)-propandiol-1,3.

11. A compound of the formula,

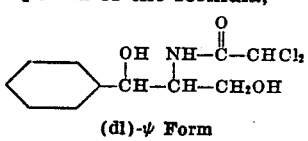

(dl)-ψ Form

HARRY M. CROOKS, Jr.
MILDRED C. REBSTOCK.
JOHN CONTROULIS.
QUENTIN R. BARTZ.

REFERENCES CITED

The following references are of record in the file of this patent:

Cherbuliez et al.: "Chemical Abstracts," vol. 25 (1931) page 2132.

Ehrlich et al.: "Science," vol. 106, October 31, 1947, page 417.